US012267932B2

(12) United States Patent
Van De Sluis et al.

(10) Patent No.: US 12,267,932 B2
(45) Date of Patent: Apr. 1, 2025

(54) ADJUSTING A ROUTINE IN DEPENDENCE ON A DIFFERENCE BETWEEN CURRENT AND EXPECTED STATES

(71) Applicant: SIGNIFY HOLDING B.V., Eindhoven (NL)

(72) Inventors: Bartel Marinus Van De Sluis, Eindhoven (NL); Dzmitry Viktorovich Aliakseyeu, Eindhoven (NL); Tobias Borra, Rijswijk (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 85 days.

(21) Appl. No.: 18/271,087

(22) PCT Filed: Jan. 3, 2022

(86) PCT No.: PCT/EP2022/050032
§ 371 (c)(1),
(2) Date: Jul. 6, 2023

(87) PCT Pub. No.: WO2022/148728
PCT Pub. Date: Jul. 14, 2022

(65) Prior Publication Data

US 2024/0057238 A1 Feb. 15, 2024

(30) Foreign Application Priority Data

Jan. 8, 2021 (EP) .................................... 21150634

(51) Int. Cl.
*H05B 47/165* (2020.01)
*H05B 47/16* (2020.01)
(Continued)

(52) U.S. Cl.
CPC .......... *H05B 47/165* (2020.01); *H05B 47/16* (2020.01); *H05B 47/19* (2020.01); *H05B 47/1965* (2024.01)

(58) Field of Classification Search
CPC .. H05B 47/165; H05B 47/19; H05B 47/1965; H05B 47/16
See application file for complete search history.

(56) References Cited

U.S. PATENT DOCUMENTS 8,344,665 B2 * 1/2013 Verfuerth ............... H05B 47/19 315/315
9,204,523 B2 * 12/2015 Reed .................. H05B 47/1965
(Continued)

FOREIGN PATENT DOCUMENTS

EP 2139299 A2 12/2009
EP 3370485 A1 9/2018
WO 2018095876 A1 5/2018

*Primary Examiner* — Daniel D Chang

(57) ABSTRACT

A method comprises, in a learning mode, learning (101) a state of one or more portable devices at a start time associated with a routine for a plurality of executions of the routine over a period of time based on received signals and determining (103) one or more expected states of the one or more portable devices at the start time associated with the routine based on the learned state. The method further comprises, in an adjustment mode, determining (105) a current state of the one or more portable devices at the start time of the routine for a current execution of the routine, determining (107) whether the current state differs from the expected state, and adjusting (109) the current execution of the routine in dependence on a difference between these states. The current execution of the routine comprises transmission of at least one light command.

15 Claims, 7 Drawing Sheets

(51) Int. Cl.
*H05B 47/175* (2020.01)
*H05B 47/19* (2020.01)

(56) References Cited

U.S. PATENT DOCUMENTS

| | | | | |
|---|---|---|---|---|
| 2009/0243517 | A1* | 10/2009 | Verfuerth ............... | H05B 47/16 315/315 |
| 2015/0305126 | A1 | 10/2015 | Maeda et al. | |
| 2016/0091871 | A1 | 3/2016 | Marti et al. | |
| 2019/0059143 | A1 | 2/2019 | McGinty et al. | |

* cited by examiner

300

ADJUSTING A ROUTINE IN DEPENDENCE ON A DIFFERENCE BETWEEN CURRENT AND EXPECTED STATES

CROSS-REFERENCE TO PRIOR APPLICATIONS

This application is the U.S. National Phase application under 35 U.S.C. § 371 of International Application No. PCT/EP2022/050032, filed on Jan. 3, 2022, which claims the benefit of European Patent Application No. 21150634.0, filed on Jan. 8, 2021. These applications are hereby incorporated by reference herein.

FIELD OF THE INVENTION

The invention relates to a system for adjusting an execution of a routine in dependence on a determined state, said routine controlling one or more lighting devices.

The invention further relates to a method of adjusting an execution of a routine in dependence on a determined state, said routine controlling one or more lighting devices.

The invention also relates to a computer program product enabling a computer system to perform such a method.

BACKGROUND OF THE INVENTION

In lighting systems, routines enable users to define how their lights should be controlled automatically, for instance, based on detected events or time-of-day. For example, the Philips Hue system supports routines like a go-to-sleep routine and a wake-up routine. However, in certain exceptional situations, it is preferable not to execute a configured routine. This is addressed in WO 2018/095876 A1, for example.

WO 2018/095876 A1 discloses that if no presence or movement was measured in the morning before a “wake-up light” routine would be executed, it would be skipped. A drawback of the controller disclosed in WO 2018/095876 A1 is that it is only able to adjust the execution of the routine in a limited set of exceptional situations.

SUMMARY OF THE INVENTION

It is a first object of the invention to provide a system, which is able to adjust the execution of a routine in a broad set of exceptional situations.

It is a second object of the invention to provide a method, which is able to adjust the execution of a routine in a broad set of exceptional situations.

In a first aspect of the invention, a system for adjusting an execution of a routine in dependence on a determined state, said routine controlling one or more lighting devices, comprises at least one receiver, at least one transmitter, and at least one processor configured to learn, in a learning mode, based on one or more signals received via said at least one receiver, one or more states of one or more portable devices at a start time associated with said routine for a plurality of executions of said routine over a period of time, determine, in said learning mode, one or more expected states of said one or more portable devices at said start time associated with said routine based on said one or more learned states, determine, in an adjustment mode, via said at least one receiver, one or more current states of said one or more portable devices at said start time of said routine for a current execution of said routine, if said one or more expected states have been determined, determine whether said one or more current states differ from said one or more expected states, and adjust, in said adjustment mode, said current execution of said routine in dependence on a difference between said one or more current states and said one or more expected states, said current execution of said routine comprising transmission of at least one light command via said at least one transmitter.

By learning a state of one or more portable devices at a start time associated with a routine, determining an expected state based on the learned state, and adjusting the execution of the routine in dependence on a difference between the expected state and the current state, it becomes possible to adjust the execution of a routine in a broad set of exceptional situations, as the exceptional situations are not predefined.

Thus, the above-described system may be used to deal with exceptions such that automatic lighting control routines can be adjusted when needed. For instance, if a person has defined a wake-up light routine and it is learned that his mobile device is normally located in the bedroom at the start time of this routine, energy may be saved by cancelling the routine if his mobile device is not in the bedroom at a certain execution of the routine. For example, the person may already be awake and no longer in the bedroom himself.

Similarly, if a person has defined a routine which fades out lights in the living room at 11 PM and it is learned that a person is normally using a web browser on his mobile phone at the start of the routine, but at a certain execution of the routine he is not, e.g. because he still active (e.g. talking, watching a movie), the user may prefer the fade-out routine to be postponed. Since many people always have a portable personal device with them, the state, e.g. position, of this device can tell a lot about their position and activity. Said one or more portable devices may comprise a mobile user device and/or a portable lighting device, for example.

In most cases, one or more lighting devices will be controlled at the start time associated with the routine. An exception is a routine which arbitrarily chooses a time for activating a light from a time interval which starts at the start time associated with the routine.

Said one or more portable devices may comprise a plurality of portable devices. If only a single state, e.g. a position, of a single portable device is determined at the start of a routine, and this state is different each execution of the routine, then it is not possible to determine an expected state. The larger the number of determined states at the start of the routine, the higher the probability that a subset of these states is frequently the same at the start of the routine and therefore that one or more expected states can be determined. By determining states of multiple portable devices, it is possible to determine a larger number of states at the start of the routine.

Said at least one processor may be configured to determine states of said mobile user device based on sensor data provided by one or more sensors comprised in said mobile user device, said states being comprised in said one or more learned states and said one or more current states. Sensors may be used to determine states like position and motion characteristics.

Said one or more learned states and said one or more current states indicate one or more of: a position of at least one of said one or more portable devices, whether at least one of said one or more portable devices is being charged, whether at least one of said one or more portable devices is being moved, whether at least one of said one or more portable devices is turned on, whether at least one of said one or more portable devices is being used, motion characteristics of at least one of said one or more portable devices, an application active on at least one of said one or more portable devices, a type of application active on at least one of said one or more portable devices, user interaction on at least one of said one or more portable devices, a setting active on at least one of said one or more portable devices, a mode of at least one of said one or more portable devices, and an orientation of at least one of said one or more portable devices.

For example, for a mobile user device, said one or more learned states and said one or more current states may indicate one or more of: a position of said mobile user device, whether said mobile user device is being charged, whether said mobile user device is being moved, whether said mobile user device is turned on, whether said mobile user device is being used, motion characteristics of said mobile user device, an application active on said mobile user device, a type of application active on said mobile user device, and user interaction on said mobile user device. Motion characteristics may include a motion intensity, a motion pattern, a device orientation (pattern), and/or a motion state (e.g. horizontal/stable vs. handheld), for example. User interaction on said mobile device may include voice input and/or use of a touchscreen, for example.

For example, for a portable lighting device, said one or more learned states and said one or more current states may indicate one or more of: a setting active on said portable lighting device, whether the portable lighting device is being charged, whether the portable lighting device is being moved, a position of the portable lighting device, an orientation of the portable lighting device, and a mode of the portable lighting device (e.g. being part of a content-based light effect, being controlled as part of a light script).

Said position of said mobile user device may indicate whether said mobile user device is home or away from home, whether said mobile user device is near said one or more lighting devices, and/or whether said mobile user device is near a user of said mobile user device, for example.

Said at least one processor may be configured to determine said start time associated with said routine based on a user-specified time, based on a start time of an agenda entry, based on a sunrise or sunset time, or based on a time of a sensor event, for example.

Said at least one processor may be configured to adjust said current execution of said routine by postponing said routine, cancelling said routine, modifying a transition time of said routine, prompting a user to decide how to adjust said routine, or causing said routine to control one or more different lighting devices. The routine may be postponed for a predefined time period or until a specific event occurs (e.g. detected arrival of a mobile user device in the area), for example.

Said at least one processor may be configured to ask said user for permission before adjusting said current execution of said routine, e.g. before delaying an exercise routine. Said at least one processor may be configured to postpone said routine by delaying a start of said current execution of said routine and delaying an end of said current execution of said routine and/or by delaying a start time of a period from which a time for starting said current execution of said routine is arbitrarily chosen, for example.

Said at least one processor may be configured to determine whether said one or more portable devices are, at said start time associated with said routine, expected to be in a same state as before said start time associated with said routine or in a same state as after an end time associated with said routine and determine how to adjust said current execution of said routine based on said expectation.

Said at least one processor may be configured to determine whether said one or more portable devices are, at said start time associated with said routine, expected to be in a same state as before said start time associated with said routine or in a same state as after said end time associated with said routine based on a type of said routine or based on user input. Alternatively or additionally, this may be learned by determining states of the one or more portable devices before the start time and/or after the end time associated with the routine.

As a first example, for a wake-up routine, the one or more portable devices may be assumed to be, at the start time associated with the routine, expected to be in a same state as before the start time associated with the routine. A wake-up routine may, for example, be cancelled or moved to another room if the one or more current states of the one or more portable devices at the start of a routine are not as expected.

As a second example, for a go-to-sleep routine to be executed on a lighting device in the bedroom at 11 PM, the user may be able to input whether he is normally in bed at 11 PM or not. If the user is normally in bed playing a game on his mobile phone at 11 PM and he is on a certain day not playing a game on his mobile phone at 11 PM, he may already be asleep. In that case, it may be best to cancel the go-to-sleep routine. On the other hand, if the user is normally making himself ready to go to bed in the bedroom or still in the living room at 11 PM and he is on a certain day already in bed at 11 PM, the end time of the fade out routine may be brought forward, or if the light is normally deactivated at an arbitrarily chosen time between 11 PM and 11.30 PM, the light may already be deactivated at 11 PM.

Said at least one processor may be configured to learn, in said learning mode, based on said one or more signals received via said at least one receiver, one or more contextual states at said start time associated with said routine for said plurality of executions of said routine over said period of time, said one or more learned contextual states indicating a number of portable devices in a space in which said one or more lighting devices are located and/or a social context in said space, determine, in said learning mode, one or more expected contextual states at said start time associated with said routine based on said one or more learned contextual states, determine, in said adjustment mode, via said at least one receiver, one or more current contextual states at said start time of said routine for said current execution of said routine, if said one or more expected contextual states have been determined, determine whether said one or more current contextual states differ from said one or more expected contextual states, and adjust, in said adjustment mode, said current execution of said routine further in dependence on a difference between said one or more current contextual states and said one or more expected contextual states.

Contextual states may be detected based on a classified sound pattern as detected by its microphone(s), for example. This classified sound pattern could indicate the number of people present and/or the social context (e.g. having dinner/drinks, having a party, watching TV/movie). Contextual states may also be derived from the proximity and type of other nearby user devices, preferably detected in the same room.

In a second aspect of the invention, a method of adjusting an execution of a routine in dependence on a determined state, said routine controlling one or more lighting devices, comprises learning, in a learning mode, based on one or more received signals, one or more states of one or more portable devices at a start time associated with said routine for a plurality of executions of said routine over a period of time, determining, in said learning mode, one or more expected states of said one or more portable devices at said start time associated with said routine based on said one or more learned states, determining, in an adjustment mode, via said at least one receiver, one or more current states of said one or more portable devices at said start time of said routine for a current execution of said routine, if said one or more expected states have been determined, determining whether said one or more current states differ from said one or more expected states, and adjusting, in said adjustment mode, said current execution of said routine in dependence on a difference between said one or more current states and said one or more expected states, said current execution of said routine comprising transmission of at least one light command. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for adjusting an execution of a routine in dependence on a determined state, said routine controlling one or more lighting devices.

The executable operations comprise learning, in a learning mode, based on one or more received signals, one or more states of one or more portable devices at a start time associated with said routine for a plurality of executions of said routine over a period of time, determining, in said learning mode, one or more expected states of said one or more portable devices at said start time associated with said routine based on said one or more learned states, determining, in an adjustment mode, via said at least one receiver, one or more current states of said one or more portable devices at said start time of said routine for a current execution of said routine, if said one or more expected states have been determined, determining whether said one or more current states differ from said one or more expected states, and adjusting, in said adjustment mode, said current execution of said routine in dependence on a difference between said one or more current states and said one or more expected states, said current execution of said routine comprising transmission of at least one light command.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
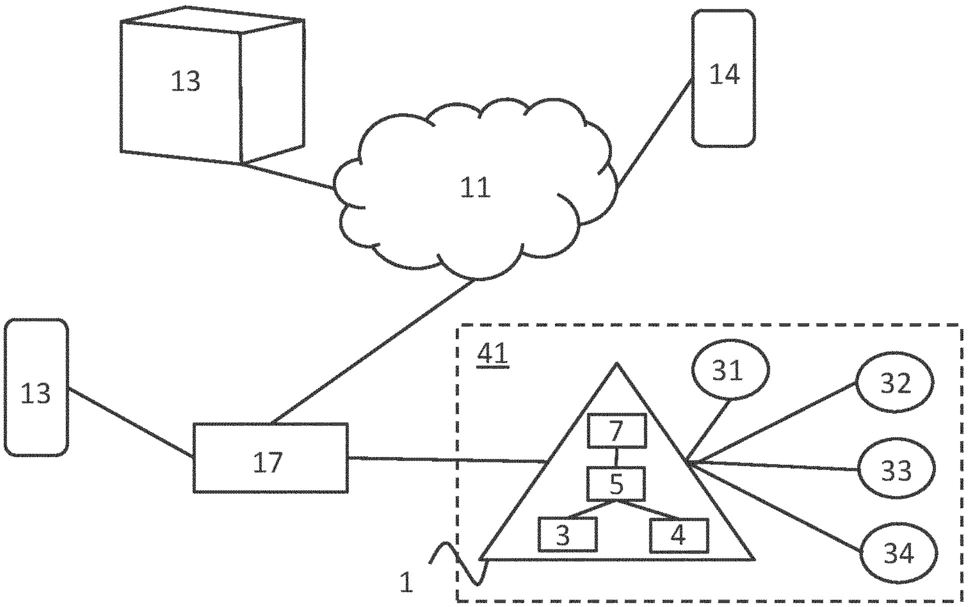
FIG. 1 is a block diagram of a first embodiment of the system.

FIG. 1 shows a first embodiment of the system for adjusting an execution of a routine in dependence on a determined state. In this first embodiment, the system is a bridge 1. The bridge 1 may be a Philips Hue bridge, for example. In the example of FIG. 1, a lighting system 41 comprises the bridge 1 and four lighting devices 31-34. The lighting devices 31-34 communicate with the bridge 1, e.g. using Zigbee technology. The routine controls one or more of lighting devices 31-34. Examples of routines are a wake-up routine, a go-to-sleep routine, a dinner time routine, and an exercise/yoga/meditation time routine. The lighting device 34 is a portable lighting device, e.g. a Hue Go.

The bridge 1 is connected to a wireless LAN access point 17, e.g. via Ethernet or Wi-Fi. The wireless LAN access point 17 is connected to the Internet 11. An Internet server 13 is also connected to the Internet 11. A mobile device 13 is also connected to the wireless LAN access point 17. The mobile device 13 may run an app for controlling lighting devices 31-34 and configuring routines, for example. A mobile device 14 is connected to the Internet 11 via a mobile communication network.

The bridge 1 comprises a receiver 3, a transmitter 4, a processor 5, and a memory 7. The processor 5 is configured to learn, in a learning mode, based on one or more signals received via the receiver 4, one or more states of one or more portable devices, e.g. of the mobile device 13, the mobile device 14, and/or the portable lighting device 34, at a start time associated with the routine for a plurality of executions of the routine over a period of time, and determine, in the learning mode, one or more expected states of the one or more portable devices at the start time associated with the routine based on the one or more learned states.

The routine may be stored in the memory 7, for example. The learned states and the expected states may be recorded in the memory 7, for example. The processor 5 may is be configured to determine the start time associated with the routine based on a user-specified time, based on a start time of an agenda entry, based on a sunrise or sunset time, or based on a time of a sensor event, for example.

The processor 5 is further configured to determine, in an adjustment mode, via the receiver 3, one or more current states of the one or more portable devices at the start time of the routine for a current execution of the routine, and if the one or more expected states have been determined, determine whether the one or more current states differ from the one or more expected states. The processor 5 is further configured to adjust, in the adjustment mode, the current execution of the routine in dependence on a difference between the one or more current states and the one or more expected states. The current execution of the routine comprises transmission of at least one light command via the transmitter 4 to one or more of the lighting devices 31-34. The at least one light command specifies the new light setting(s), e.g. a fade-out light effect.

The processor 5 may be configured to adjust the current execution of the routine by postponing the routine, cancelling the routine, modifying a transition time of the routine, prompting a user to decide how to adjust the routine, or causing the routine to control one or more different lighting devices, for example.

Routine adjustments may also be communicated to the user, either actively (as a push notification or spoken message) or passively (e.g. shown in the lighting control app). A push notification or spoken message could also be used to ask the user what he wants the system to do, e.g. continue as planned, postpone, or cancel the routine. The system could also offer more intelligent options, such as "postpone until everyone has left the room" and enabling a user to select the option "always do this in case of similar circumstances".

In the embodiment of FIG. 1, the processor 5 is configured to determine the states of the mobile device 13 and/or 14 based on sensor data provided by one or more sensors comprised in the mobile device 13 and/or 14. The states of these one or more portable devices may indicate a position of the mobile device 13 and/or 14, for example. The position of the mobile device 13 and/or 14 may indicate whether the mobile device 13 and/or 14 is home or away from home, whether the mobile device 13 and/or 14 is near the one or more lighting devices 31-34, and/or whether the mobile device 13 and/or 14 is near a user of the mobile user device 13 and/or 14, for example.

Alternatively or additionally, the states of the one or more portable devices may indicate whether the mobile device 13 and/or 14 is being charged, whether the mobile device 13 and/or 14 is being moved, whether the mobile device 13 and/or 14 is turned on, whether the mobile device 13 and/or 14 is being used, motion characteristics of the mobile device 13 and/or 14, an application active on the mobile device 13 and/or 14, a type of application active on the mobile device 13 and/or 14, user interaction on the mobile device 13 and/or 14, and/or a setting active on the portable lighting device 34, for example.

Distinguishing between apps or app types may be beneficial if the different apps or app types indicate very different level of activity or concentration required or imply different social settings. For example, a user may normally use a Spotify/music streaming app at the start time of the go-to-sleep routine (e.g. if the user uses music to fall asleep). If the user is exceptionally using a Netflix/video streaming app at the start time of the go-to-sleep routine instead, the routine may be postponed. Similarly, if the user plays an action-oriented game on his smart phone, while he normally uses a Kindle app to read an eBook at the start time of the go-to-sleep routine, the routine might be postponed.

In the embodiment of the bridge 1 shown in FIG. 1, the bridge 1 comprises one processor 5. In an alternative embodiment, the bridge 1 comprises multiple processors. The processor 5 of the bridge 1 may be a general-purpose processor, e.g. ARM-based, or an application-specific processor. The processor 5 of the bridge 1 may run a Unix-based operating system for example. The memory 7 may comprise one or more memory units. The memory 7 may comprise solid-state memory, for example. The memory 7 may be used to store a table of connected lights, for example.

The receiver 3 and the transmitter 4 may use one or more wired or wireless communication technologies, e.g. Ethernet or Wi-Fi for communicating with the wireless LAN access point 17 and Zigbee for communicating with the lighting devices 31-34, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The bridge 1 may comprise other components typical for a network device such as a power connector. The invention may be implemented using a computer program running on one or more processors.

Figure 2:
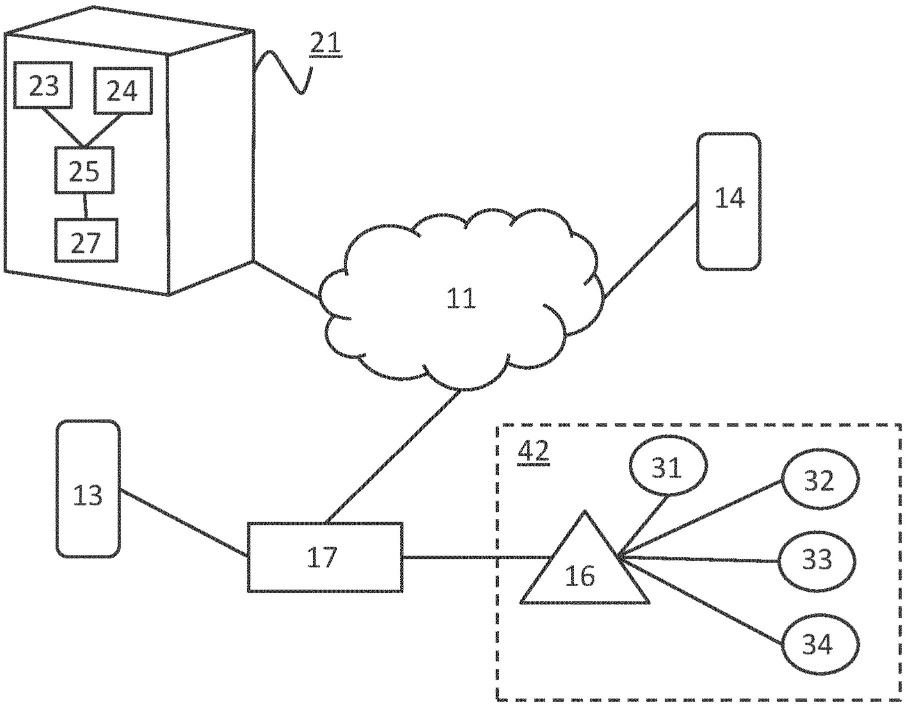
FIG. 2 is a block diagram of a second embodiment of the system.

FIG. 2 shows a second embodiment of the system for adjusting an execution of a routine in dependence on a determined state. In this second embodiment, the system is a computer 21. The computer 21 is an Internet server connected to the Internet 11. In the example of FIG. 2, a lighting system 42 comprises a bridge 16 and the four lighting devices 31-34. The routine controls one or more of the lighting devices 31-34. The lighting device 34 is a portable lighting device, e.g. a Hue Go. In the example of FIG. 2, the lighting system 42 comprises a bridge. Alternatively, the lighting system 42 might not comprise a bridge.

The computer 21 comprises a receiver 23, a transmitter 24, a processor 25, and storage means 27. The processor 25 is configured to learn, in a learning mode, based on one or more signals received via the receiver 24, one or more states of one or more portable devices, e.g. of the mobile device 13, the mobile device 14, and/or the portable lighting device 34, at a start time associated with the routine for a plurality of executions of the routine over a period of time, and determine, in the learning mode, one or more expected states of the one or more portable devices at the start time associated with the routine based on the one or more learned states. The routine may be stored in the memory 27 or in the bridge 16, for example. The learned states and the expected states may be recorded in the memory 27, for example.

The processor 25 is further configured to determine, in an adjustment mode, via the receiver 23, one or more current states of the one or more portable devices at the start time of the routine for a current execution of the routine, and if the one or more expected states have been determined, determine whether the one or more current states differ from the one or more expected states. The processor 25 is further configured to adjust, in the adjustment mode, the current execution of the routine in dependence on a difference between the one or more current states and the one or more expected states. The current execution of the routine comprises transmission of at least one light command via the transmitter 24. The at least one light command is transmitted to one or more of lighting devices 31-34 via the bridge 16.

In the embodiment of the computer 21 shown in FIG. 2, the computer 21 comprises one processor 25. In an alternative embodiment, the computer 21 comprises multiple processors. The processor 25 of the computer 21 may be a general-purpose processor, e.g. from Intel or AMD, or an application-specific processor. The processor 25 of the computer 21 may run a Windows or Unix-based operating system for example. The storage means 27 may comprise one or more memory units. The storage means 27 may comprise one or more hard disks and/or solid-state memory, for example. The storage means 27 may be used to store an operating system, applications and application data, for example.

The receiver 23 and the transmitter 24 may use one or more wired and/or wireless communication technologies such as Ethernet and/or Wi-Fi (IEEE 802.11) to connect to the Internet 11, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 23 and the transmitter 24 are combined into a transceiver. The computer 21 may comprise other components typical for a computer such as a power connector. The invention may be implemented using a computer program running on one or more processors.

In the embodiments of FIGS. 1-2, the system of the invention comprises a bridge or a computer. In an alternative embodiment, the system of the invention is a different device. In the embodiments of FIGS. 1-2, the system of the invention comprises a single device. In an alternative embodiment, the system of the invention comprises a plurality of devices.

Figure 3:
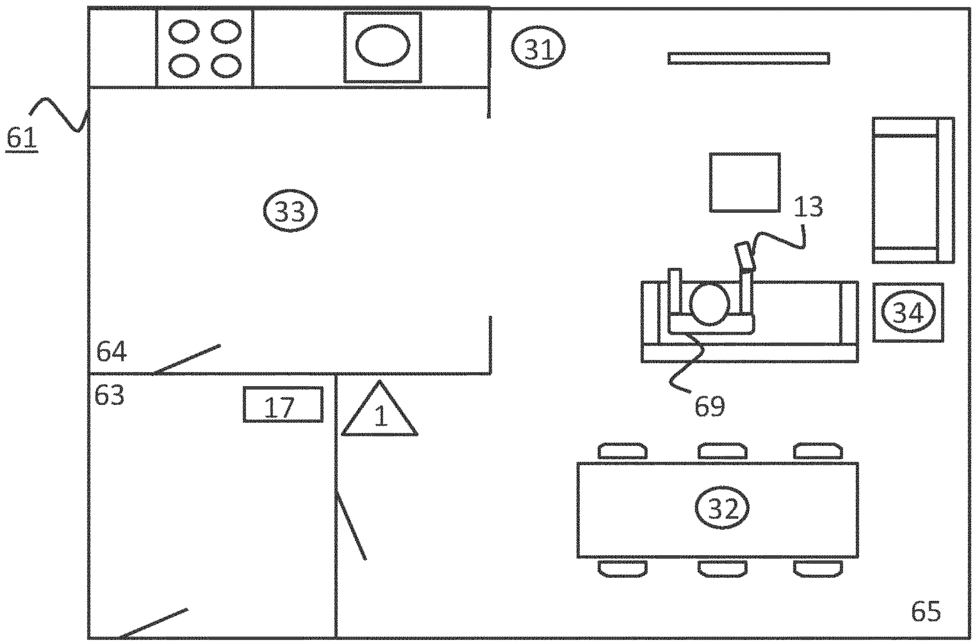
FIG. 3 shows an example spaces where routines may be executed.

FIG. 3 shows an example of spaces where routines may be executed. A first floor 61 of a home consists of a hallway 63, a kitchen 64, and a living room 65. Wireless LAN access point 17 has been installed in the hallway 63. Lighting device 33 has been installed in the kitchen 33. Bridge 1, lighting devices 31 and 32 have been installed in the living room 65. Lighting device 34 is a portable lighting device that has been placed on a table next to a couch on which user 69 of a mobile device 13 is sitting.

In the example of FIG. 3, the user 69 is sitting on the couch in the living room 65 using his mobile device 13 before going to bed in the evening. The user 69 has programmed a go-to-sleep routine to start at 11 PM on lighting device 31 and fade out in half an hour. Normally, the user is sitting on the couch using the web browser on his mobile device 13 when the go-to-sleep routine starts at 11 PM. When the light of lighting device 31 starts to fade out, this reminds the user 69 that it is time to go to bed.

Sometimes, the user has a guest at 11 PM and is not using the web browser on his mobile device 13. Instead he may be charging his mobile device 13, for example. At other times, the user is cleaning the living room 65 at 11 PM and has switched on lighting device 34 to get better visibility. In these exceptional situations, the go-to-sleep routine is not executed normally. The execution of the go-to-sleep routine may be postponed, for example.

Figure 4:
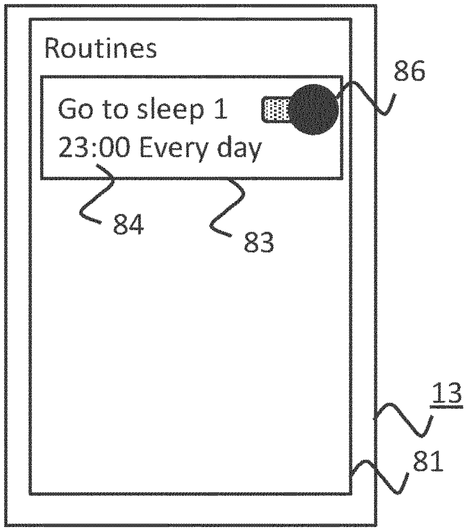
FIG. 4 shows an example of a user interface for creating a routine.

FIG. 4 shows an example of a user interface for creating a routine. The mobile device 13 of FIGS. 1 and 2 comprises a display 81, which displays the user interface for creating a routine. The user may be able to select a type of routine from multiple types of routines, e.g. a go-to-sleep routine, a home and away routine, or a wake-up routine. In the example of FIG. 4, the user has created his first go-to-sleep routine 83 with a start time 84 of 11 PM (23.00), to be executed every day. With a slider 86, the user is able to turn the routine on and off.

Figure 5:
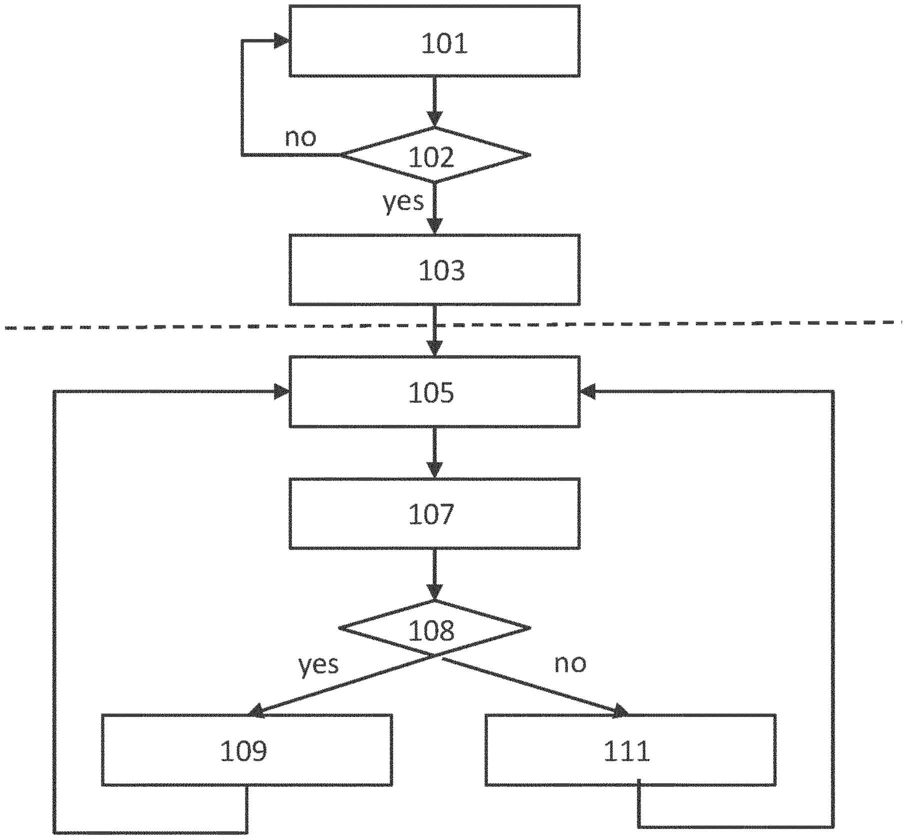
FIG. 5 is a flow diagram of a first embodiment of the method.

A first embodiment of the method of adjusting an execution of a routine in dependence on a determined state is shown in FIG. 5. The routine controls one or more lighting devices. The method may be performed by the bridge 1 of FIG. 1 or the computer 21 of FIG. 2, for example.

A step 101 comprises learning, in a learning mode, based on one or more received signals, one or more states of one or more portable devices at a start time associated with the routine. The one or more portable devices may comprise one or more mobile user devices and/or one or more portable lighting devices, for example. The start time associated with the routine may be determined based on a user-specified time, based on a start time of an agenda entry, based on a sunrise or sunset time, or based on a time of a sensor event, for example.

Next, a step 102 comprises checking whether it is possible to determine one or more expected states of the one or more portable devices at the start time associated with the routine based on the one or more learned states. The learned states have been learned for a plurality of executions of the routine over a period of time. For example, after states have been determined (in step 101) at the start time of a new routine at least a minimum number of times and at least some learned states are repeatedly determined in at least a minimum percentage of cases, the one or more expected states may be determined in the learning mode in a step 103. If it is not possible to determine the one or more expected states yet, step 101 is repeated.

After step 103, a step 105 is performed. Step 105 comprises determining, in an adjustment mode, one or more current states of the one or more portable devices at the start time of the routine for a current execution of the routine. Then, a step 107 comprises determining whether the one or more current states differ from the one or more expected states. In a step 108, it is checked whether (sufficient) differences were determined in step 107 and if so, a step 109 is performed.

Thresholds for determining whether differences are sufficiently different may be learned in step 103. For example, if a user is always sitting on a couch and it is possible to determine (indoor) positions accurately, a relatively small threshold may be determined. If a user is not always sitting on a couch, but always located in the same room, a larger threshold may be determined. In the case that there are no or insufficient differences, a step 111 is performed. Step 111 comprises executing the routine normally. The execution of the routine comprises transmission of at least one light command.

Step 109 comprises adjusting, in the adjustment mode, the current execution of the routine. Adjustment of the routine may be dependent on the type of routine. For instance, in the case of a wake-up routine in a bedroom, the wake-up light may only activate if the user device is also in the bedroom, and the wake-up routine may be cancelled if the user device is detected in a different room. It is also possible that the wake-up routine is relocated to the room where the personal user device has been detected. For instance, in the middle of the night, the user may have moved to another room, for instance, because it became too warm in the bedroom. It would then be beneficial if the wake-up routine would automatically be activated in the other room.

In the case of a go-to-sleep routine in the living room, a gradual fade-out may be started at the start time of the routine if the user is using a web browser on his mobile device. If the user is not using a web browser on his mobile device the start time of the routine, the fade-out may be postponed.

Besides wake-up and go-to-bed routines, a user may also have predefined time-, agenda- or event-based activation of "dinner time light", "exercise/yoga/meditation time", whereby the lights both remind and help to prepare the user of a scheduled activity and (gradually) adjust the light such that it is optimized for the activity. If normally people are present before dinner time, and preparing food in the kitchen, but currently no one is present in normal locations, or people show a completely different activity pattern, the system may decide to adjust the routine, optionally after asking permission from the user.

Figure 6:
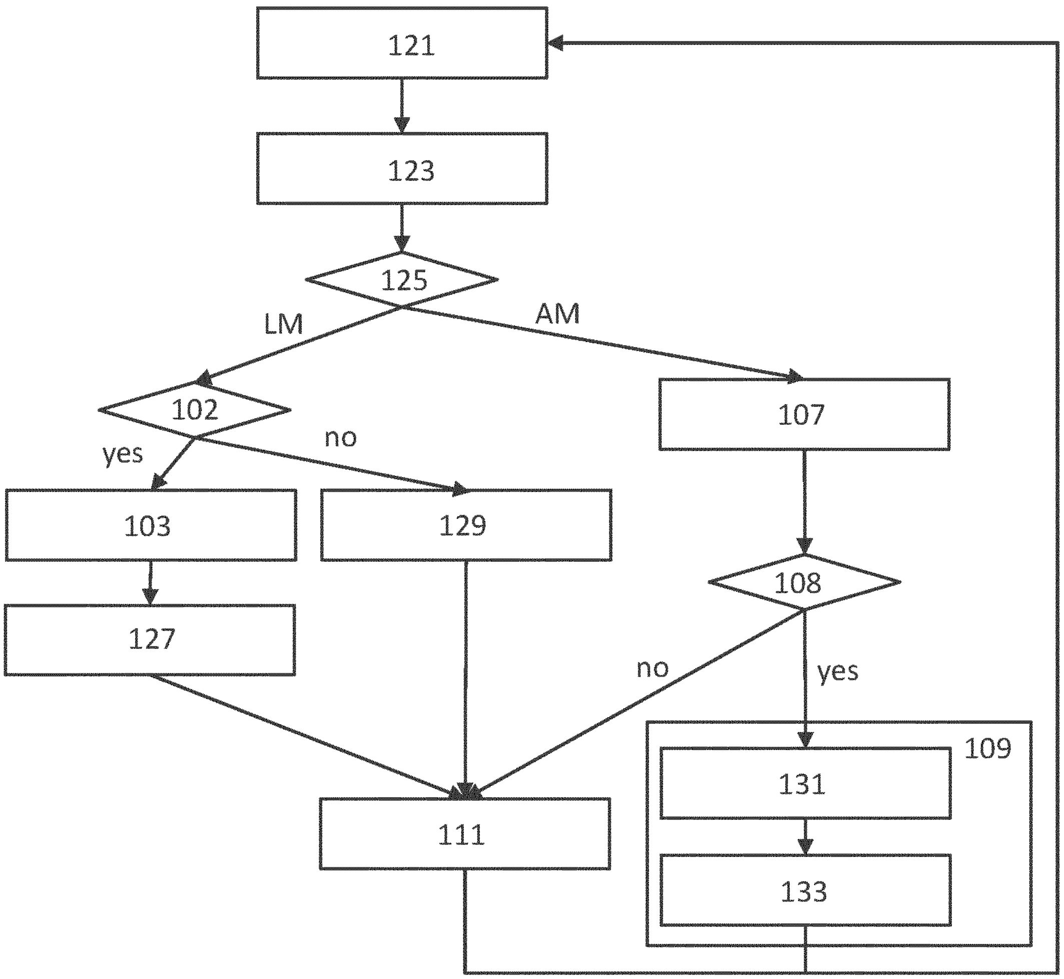
FIG. 6 is a flow diagram of a second embodiment of the method.

A second embodiment of the method of adjusting an execution of a routine in dependence on a determined state is shown in FIG. 6. The method may be performed by the bridge 1 of FIG. 1 or the computer 21 of FIG. 2, for example.

A step 121 comprises determining that a routine has been triggered, e.g. at a predetermined time or by a sensor event. A routine typically describes what light settings to activate on one or more lighting devices at a particular moment (e.g. time-of-day, or upon a detected event). The routine may be defined by a user as part of a lighting control app and stored in a local lighting control device (e.g. in a bridge or a lamp) and/or may be stored in the cloud.

In a system like Philips Hue, a user can define scenes (light settings for each individual lighting device) and rooms (groups of lighting devices). This makes routine definition rather easy, since a user can simply define that every weekday at 7.15 AM his bedroom lamps should activate the wake-up light scene. External routines, such as IFTTT, that are not stored in a lighting control device or in an accessible cloud storage, are more difficult to analyze.

In the case of the Hue system, when an external routine triggers a change, it happens via the Hue cloud. In the Hue app, external routines are referred to as "routines from the other apps". When such a trigger is received by the Hue system, it also contains a handle to the external system that requests the change in lighting. When the Hue system recognizes an external routine, it could prompt the user and ask if it is a reoccurring routine or use historical information to determine if it is a reoccurring routine. In both cases, it could then store this information to include external routines in the analysis.

Since the lighting system may not (always) be aware of the reason for the trigger/routine, the lighting system could cancel the routine, but to postpone it, the lighting system will need to communicate with the other system such that it can trigger the routine again later.

A step 123 comprises determining one or more current states of one or more portable devices at the start time of the routine. This start time may be a user-specified time, a start time of an agenda entry, a sunrise or sunset time, or a time of a sensor event, for example. Typically, (just) before the system is about to take the lighting control action corresponding to the routine, it will detect the state of the one or more portable devices. The determined one or more states of mobile user devices preferably comprise position.

In a broad sense, position may indicate whether the mobile user device is at home or away from home (e.g. using GPS or access to Wi-Fi networks). More specifically, the system may determine a position in the home, such as in what room the user device is currently present (e.g. using RF-based positioning or VLC-based positioning). In a simpler implementation, the system may only check if the mobile user device is available in the area where the routine-based lighting control action is about to be executed. In the case that the routine that only affects a subset of lighting devices in the room (e.g. Hue 'zones'), the system could additionally check the proximity to the subset of lighting devices. Instead of determining the position of a single mobile user device, the positions of multiple mobile user devices may be determined.

Instead of or in addition to positions, one or more other states of a portable device may be detected. For instance, it may be detected if the device is currently near the user, if it is carried or actively used by the user, or whether it is in a stationary position or in a charging dock. Furthermore, the mobile device sensors may be used, e.g. to detect motion characteristics.

Next, a step 125 comprises determining whether the routine is still in a learning mode. If so, step 102 is performed. If not, step 107 is performed. Step 102 comprises checking whether it is possible to determine one or more expected states of the one or more portable devices at the start time associated with the routine based on the one or more states learned in the current iteration and in previous iterations of step 121. If so, the one or more expected states are determined in step 103 and the routine is taken out of the learning mode in a step 127. If it is not possible to determine the one or more expected states yet, a step 129 is performed. Step 129 comprises recording the one or more states learned in the current iteration of step 123. Step 111 is performed after step 127 or step 129 has been performed.

If it is determined in step 125 that the routine is no longer in the learning mode, step 107 is performed. Step 107 comprises determining whether the one or more current states, determined in the current iteration of step 123, differ from the one or more expected states, previously determined in step 103. If the user is not satisfied with the expected states that have been determined, he may be able to reset the learned states and manually put the routine in the learning mode again. In step 108, it is checked whether (sufficient) differences were determined in step 107 and if so, a step 109 is performed. If not, step 111 is performed.

In the embodiment of FIG. 6, step 109 is implemented by steps 131 and 133. Step 131 comprises prompting a user to decide how to adjust the routine. Step 131 comprises receiving the user's answer. Step 133 comprises adjusting the execution of the routine based on the answer given by the user in step 131.

In the case of an external routine, the system performing the method could, depending on the user's answer, simply cancel the execution of the routine or postpone the execution of the routine without communicating with the external system. Alternatively, it could inform the remote system that the routine cannot be triggered at the moment and should be delayed, and later it can inform the remote system that the routine can be triggered now; in this case the remote system could decide itself if triggering the routine at the later stage make sense or if it should be canceled.

Step 111 comprises executing the routine normally. The execution of the routine comprises transmission of at least one light command. Step 121 is repeated after step 109 or step 111 has been performed and the method then proceeds as shown in FIG. 6.

Figure 7:
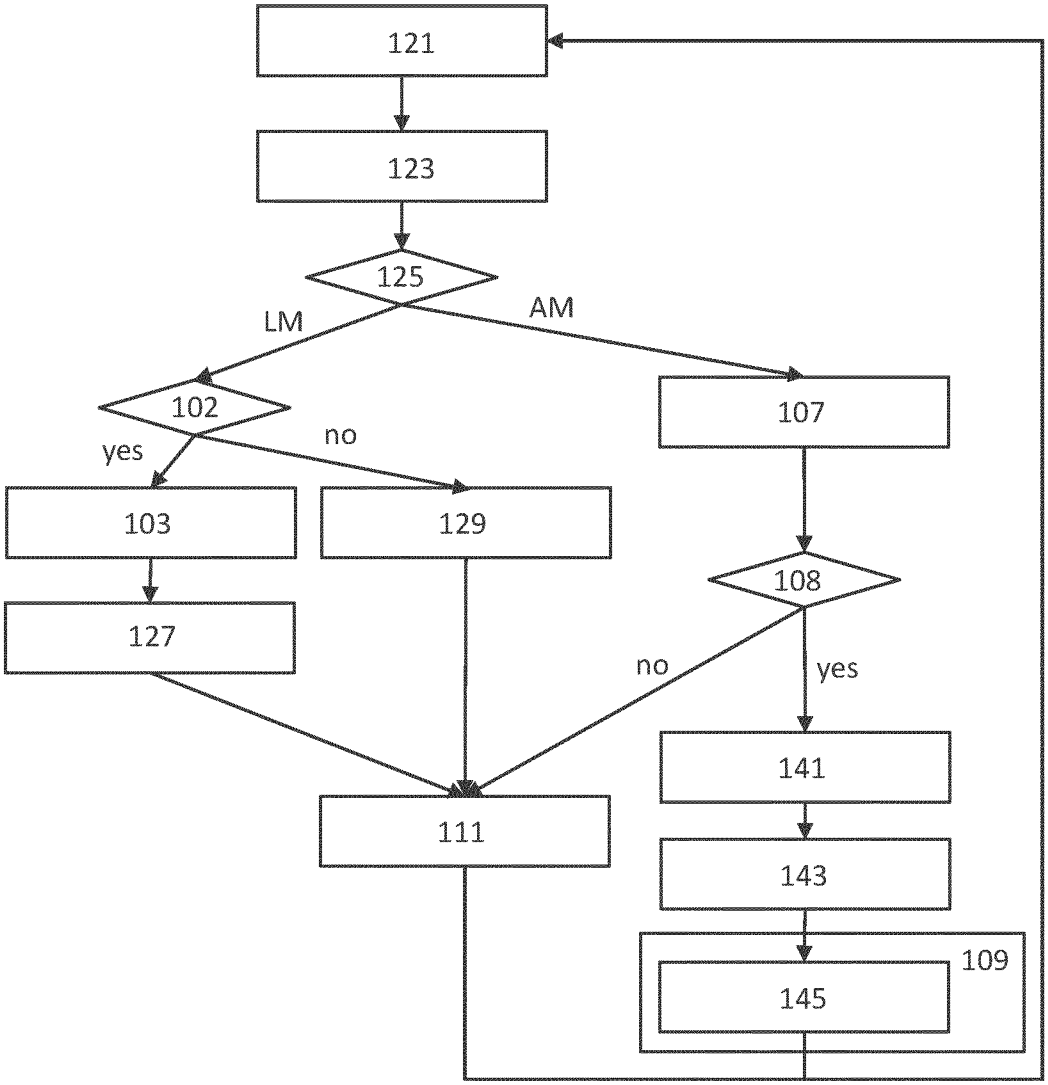
FIG. 7 is a flow diagram of a third embodiment of the method.

A third embodiment of the method of adjusting an execution of a routine in dependence on a determined state is shown in FIG. 7. In this third embodiment, compared to the second embodiment of FIG. 6, steps 141 and 143 are performed before step 109 and step 109 is implemented by a step 145 instead of by steps 131 and 133.

Step 141 comprises determining whether the one or more portable devices are, at the start time associated with the routine, expected to be in a same state as before the start time associated with the routine or in a same state as after an end time associated with the routine, e.g. based on a type of the routine or based on user input. For example, for a wake-up routine, the one or more portable devices may be assumed to be, at the start time associated with the routine, expected to be in a same state as before the start time associated with the routine. For a go-to-sleep routine (e.g. to be executed with a lighting device in the bedroom), it may be necessary to make the determination of step 141 based on user input. Step 143 comprises determining how to adjust the current execution of the routine based on the expectation determined in step 141.

For instance, if the user specifies a start time of 11 PM for a "go-to-sleep" routine, it could be that a) he is often already using Spotify to fall sleep at that time or alternatively, that b) he is often still using Netflix at that time. In scenario (a), if the user is then still using Netflix at 11 PM (thereby deviating from normal behavior), the routine may be postponed. In scenario (b), if the user is then already using Spotify at 11 PM (thereby deviating from normal behavior), the purpose of the routine may be taken into account to determine how to adjust the execution of the routine. For example, in scenario (b), it may be assumed that the "go-to-sleep" routine is usually used to prepare for bed and go to sleep. Then, if the deviation from the normal behavior is a less active behavior (e.g. instead of Netflix, listening to relaxing music via Spotify app), the routine should preferably not be postponed or cancelled.

The knowledge about the "nature" of the routine can either be given to the system that performs the method as a parameter, which can be used when deciding to cancel or postpone, or it can be learned from the past behaviors, i.e. it could check if similar deviations occurred in the past and if it caused a user to stop the routine. The advantage of the first approach is that it could be applied immediately after the normal behavior is learned, so even if a specific deviation happens for the first time the system could already act. The second approach will require more learning and when a specific deviation happens for the first time it will not be able to react to it, but in a long term it will be more versatile compared to the first approach. The system could also use a combination of both approaches.

Step 145 comprises adjusting the current execution of the routine by postponing the routine, cancelling the routine, modifying a transition time of the routine, or cause the routine to control one or more different lighting devices. In step 145, the routine may be postponed, for example, by delaying a start of the current execution of the routine and delaying an end of the current execution of the routine and/or by delaying a start time of a period from which a time for starting the current execution of the routine is arbitrarily chosen.

For instance, in the Hue system, a user is able to specify a transition time (i.e. how quickly the lighting system should transit from its current light settings to new light settings defined by the routine) for some types of routines. The user is also able to indicate a time span within which the routine is randomly activated (e.g. switch to scene A at random in the time period between 7 PM and 7.30 PM, usually used to simulate presence of a human to avoid always exact time light change). Deviation from a normal/expected behavior detected with personal devices could then for example increase the transition time instead of postponing the routine, and in case of a random activation, it could adjust the time period within which it can be activated e.g. instead of 7-7.30 PM, extend or reduce it, e.g. change random activation from 7-7.30 PM to 7.15-7.30 PM.

In step 145, the user may be asked for permission before adjusting the current execution of the routine, e.g. whether to postpone an exercise routine if no music application is active on the user's mobile device yet.

Figure 8:
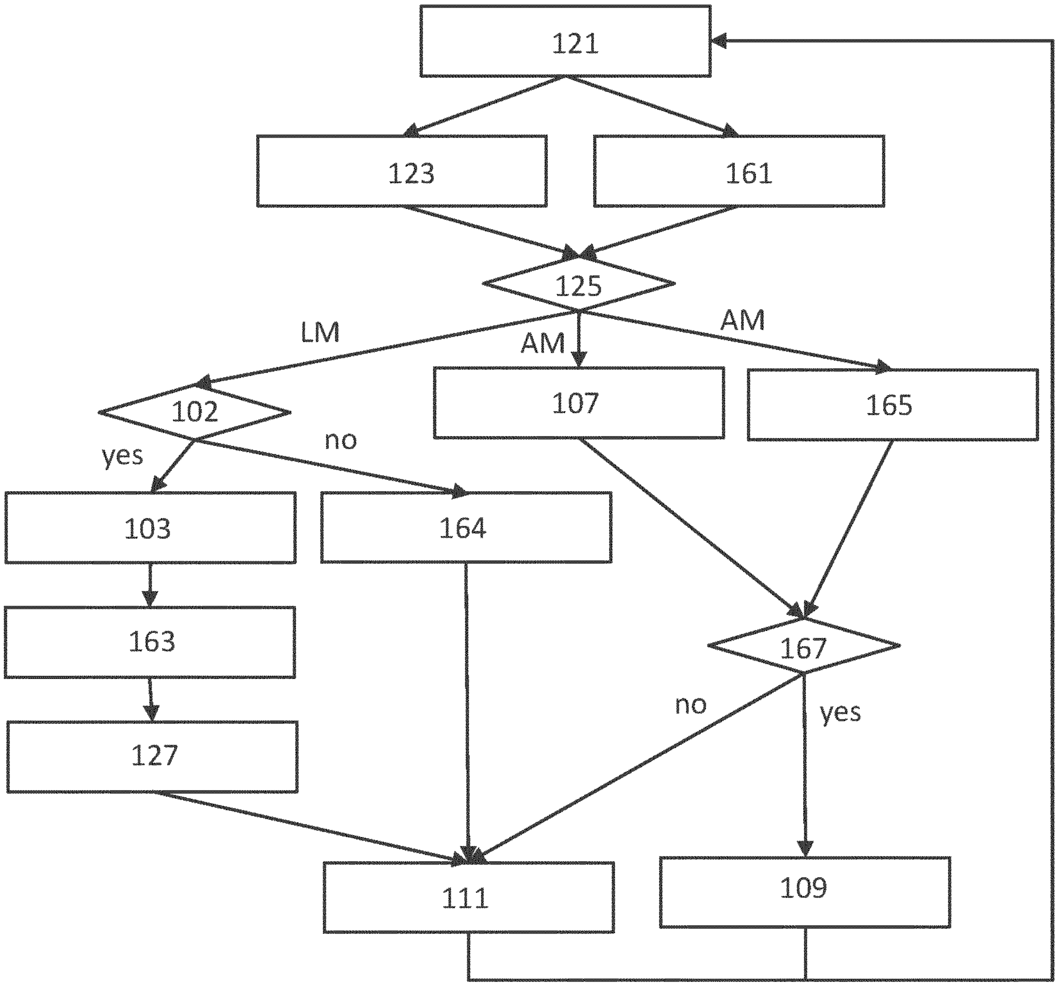
FIG. 8 is a flow diagram of a fourth embodiment of the method.

A fourth embodiment of the method of adjusting an execution of a routine in dependence on a determined state is shown in FIG. 8. The routine controls one or more lighting devices. The method may be performed by the bridge 1 of FIG. 1 or the computer 21 of FIG. 2, for example.

Step 121 comprises determining that a routine has been triggered, e.g. at a predetermined time or by a sensor event. Step 123 comprises determining one or more current states of one or more portable devices at a start time associated with the routine. A step 161 comprises determining one or more contextual states at the start time associated with the routine. The one or more contextual states indicate a number of portable devices in a space in which the one or more lighting devices are located and/or a social context in the space. In the embodiment of FIG. 8, step 161 is performed in parallel with at least part of step 123. In an alternative embodiment, step 161 is performed before or after step 123.

Next, a step 125 comprises determining whether the routine is still in a learning mode. If so, step 102 is performed. If not, steps 107 and 165 are performed. Step 102 comprises checking whether it is possible to determine one or more expected states and one or more expected contextual states of the one or more portable devices at the start time associated with the routine. If so, step 103 is performed next.

Step 103 comprises determining the one or more expected states of the one or more portable devices at the start time associated with the routine based on the one or more states learned in the current iteration and in previous iterations of step 121. Then, step 163 comprises determining the one or more expected contextual states at the start time associated with the routine based on the one or more contextual states learned in the current iteration and in previous iterations of step 161. In the embodiment of FIG. 8, step 163 is performed after step 103. In an alternative embodiment, step 163 is performed before step 103 or at least partly in parallel with step 103. After step 163, the routine is taken out of the learning mode in a step 127.

If it is not possible to determine the one or more expected states yet, a step 164 is performed. Step 164 comprises recording the one or more states learned in the current iteration of step 123 and the one or more contextual states learned in the current iteration of step 161. Step 111 is performed after step 127 or step 164 has been performed.

If it is determined in step 125 that the routine is no longer in the learning mode, steps 107 and 165 are performed. Step 107 comprises determining whether the one or more current states, determined in the current iteration of step 123, differ from the one or more expected states, previously determined in step 103. Step 165 comprises determining whether the one or more current contextual states, determined in the current iteration of step 161, differ from the one or more expected contextual states, previously determined in step 163.

In step 167, it is checked whether (sufficient) differences were determined in steps 107 and 165, and if so, step 109 is performed. If not, step 111 is performed. Step 111 comprises executing the routine normally. The execution of the routine comprises transmission of at least one light command.

Step 109 comprises adjusting the execution of the routine. For example, in the case of a go-to-sleep routine in the living room, a gradual fade-out may be started at the start time of the routine if the user is using a web browser on his mobile device and one person is in the living room. If the user is not using a web browser on his mobile device at the start time of the routine or multiple persons are in the room, the fade-out may be postponed. Step 121 is repeated after step 109 or step 111 has been performed and the method then proceeds as shown in FIG. 8.

The embodiments of FIGS. 5 to 8 differ from each other in multiple aspects, i.e. multiple steps have been added or replaced. In variations on these embodiments, only a subset of these steps is added or replaced and/or one or more steps is omitted. For example, steps 141 and 143 may be omitted from the embodiment of FIG. 7 and/or added to the embodiments of FIGS. 5, 6, and/or 8.

Figure 9:
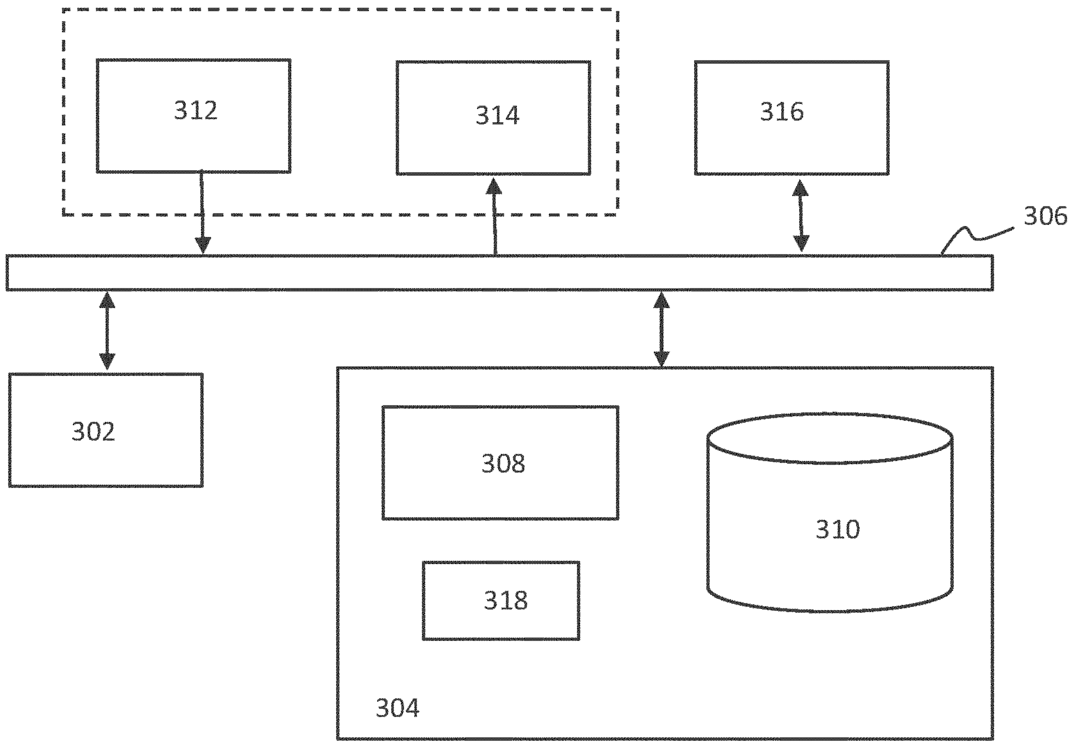
FIG. 9 is a block diagram of an exemplary data processing system for performing the method of the invention.

FIG. 9 depicts a block diagram illustrating an exemplary data processing system that may perform the method as described with reference to FIGS. 5 to 8.

As shown in FIG. 9, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 9, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 9) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

FIG. 9 shows the input device 312 and the output device 314 as being separate from the network adapter 316. However, additionally or alternatively, input may be received via the network adapter 316 and output be transmitted via the network adapter 316. For example, the data processing system 300 may be a cloud server. In this case, the input may be received from and the output may be transmitted to a user device that acts as a terminal.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for adjusting an execution of a routine in dependence on a determined state, said routine controlling one or more lighting devices, said system comprising:

at least one receiver, at least one transmitter; and at least one processor configured to:

learn, in a learning mode, based on one or more signals received via said at least one receiver, one or more states of one or more portable devices at a start time associated with said routine for a plurality of executions of said routine over a period of time, determine, in said learning mode, one or more expected states of said one or more portable devices at said start time associated with said routine based on said one or more learned states, determine, in an adjustment mode, via said at least one receiver, one or more current states of said one or more portable devices at said start time of said routine for a current execution of said routine, if said one or more expected states have been determined, determine whether said one or more current states differ from said one or more expected states, and adjust, in said adjustment mode, said current execution of said routine in dependence on a difference between said one or more current states and said one or more expected states, said current execution of said routine comprising transmission of at least one light command via said at least one transmitter.

2. A system as claimed in claim 1, wherein said one or more portable devices comprise a plurality of portable devices.

3. A system as claimed in claim 1, wherein said one or more portable devices comprise a mobile user device and/or a portable lighting device.

4. A system as claimed in claim 3, wherein said at least one processor is configured to determine states of said mobile user device based on sensor data provided by one or more sensors comprised in said mobile user device, said states being comprised in said one or more learned states and said one or more current states.

5. A system as claimed in claim 1, wherein said one or more learned states and said one or more current states indicate one or more of: a position of at least one of said one or more portable devices, whether at least one of said one or more portable devices is being charged, whether at least one of said one or more portable devices is being moved, whether at least one of said one or more portable devices is turned on, whether at least one of said one or more portable devices is being used, motion characteristics of at least one of said one or more portable devices, an application active on at least one of said one or more portable devices, a type of application active on at least one of said one or more portable devices, user interaction on at least one of said one or more portable devices, a setting active on at least one of said one or more portable devices, a mode of at least one of said one or more portable devices, and an orientation of at least one of said one or more portable devices.

6. A system as claimed in claim 5, wherein said one or more portable devices comprise a mobile user device, said one or more learned states and said one or more current states indicate a position of said mobile user device, and said position of said mobile user device indicates whether said mobile user device is home or away from home, whether said mobile user device is near said one or more lighting devices, and/or whether said mobile user device is near a user of said mobile user device.

7. A system as claimed in claim 1, wherein said at least one processor is configured to determine said start time associated with said routine based on a user-specified time, based on a start time of an agenda entry, based on a sunrise or sunset time, or based on a time of a sensor event.

8. A system as claimed in claim 1, wherein said at least one processor is configured to adjust said current execution of said routine by postponing said routine, cancelling said routine, modifying a transition time of said routine, prompting a user to decide how to adjust said routine, or causing said routine to control one or more different lighting devices.

9. A system as claimed in claim 8, wherein said at least one processor is configured to postpone said routine by delaying a start of said current execution of said routine and delaying an end of said current execution of said routine and/or by delaying a start time of a period from which a time for starting said current execution of said routine is arbitrarily chosen.

10. A system as claimed in claim 1, wherein said at least one processor is configured to ask said user for permission before adjusting said current execution of said routine.

11. A system as claimed in claim 1, wherein said at least one processor is configured to determine whether said one or more portable devices are, at said start time associated with said routine, expected to be in a same state as before said start time associated with said routine or in a same state as after an end time associated with said routine and determine how to adjust said current execution of said routine based on said expectation.

12. A system as claimed in claim 11, wherein said at least one processor is configured to determine whether said one or more portable devices are, at said start time associated with said routine, expected to be in a same state as before said start time associated with said routine or in a same state as after said end time associated with said routine based on a type of said routine or based on user input.

13. A system as claimed in claim 1, wherein said at least one processor is configured to:

learn, in said learning mode, based on said one or more signals received via said at least one receiver, one or more contextual states at said start time associated with said routine for said plurality of executions of said routine over said period of time, said one or more learned contextual states indicating a number of portable devices in a space in which said one or more lighting devices are located and/or a social context in said space, determine, in said learning mode, one or more expected contextual states at said start time associated with said routine based on said one or more learned contextual states, determine, in said adjustment mode, via said at least one receiver, one or more current contextual states at said start time of said routine for said current execution of said routine, if said one or more expected contextual states have been determined, determine whether said one or more current contextual states differ from said one or more expected contextual states, and adjust, in said adjustment mode, said current execution of said routine further in dependence on a difference between said one or more current contextual states and said one or more expected contextual states.

14. A method of adjusting an execution of a routine in dependence on a determined state, said routine controlling one or more lighting devices, said method comprising:

learning, in a learning mode, based on one or more received signals, one or more states of one or more portable devices at a start time associated with said routine for a plurality of executions of said routine over a period of time;

determining, in said learning mode, one or more expected states of said one or more portable devices at said start time associated with said routine based on said one or more learned states;

determining, in an adjustment mode, via said at least one receiver, one or more current states of said one or more portable devices at said start time of said routine for a current execution of said routine;

if said one or more expected states have been determined, determining whether said one or more current states differ from said one or more expected states; and adjusting, in said adjustment mode, said current execution of said routine in dependence on a difference between said one or more current states and said one or more expected states, said current execution of said routine comprising transmission of at least one light command.

15. A computer program product for a computing device, the computer program product comprising computer program code to perform the method of claim 14 when the computer program product is run on a processing unit of the computing device.

* * * * *